Aug. 23, 1960  N. S. WALKER  2,949,799
GAGE-CONTROL SYSTEM FOR MULTI-STAND STRIP MILL
Filed Sept. 25, 1956
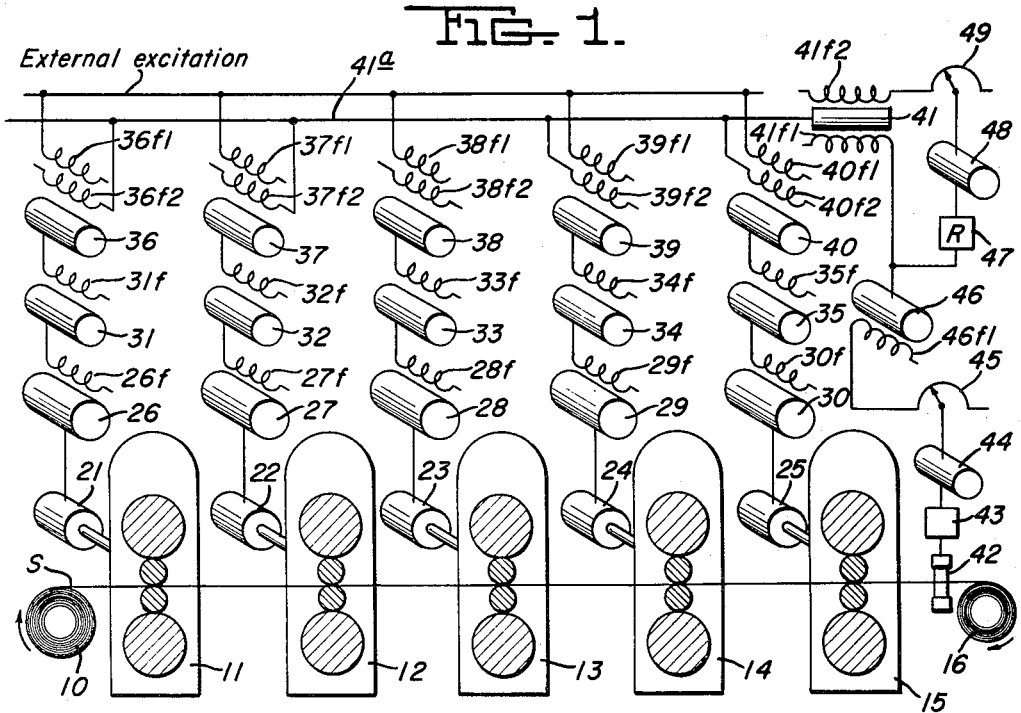
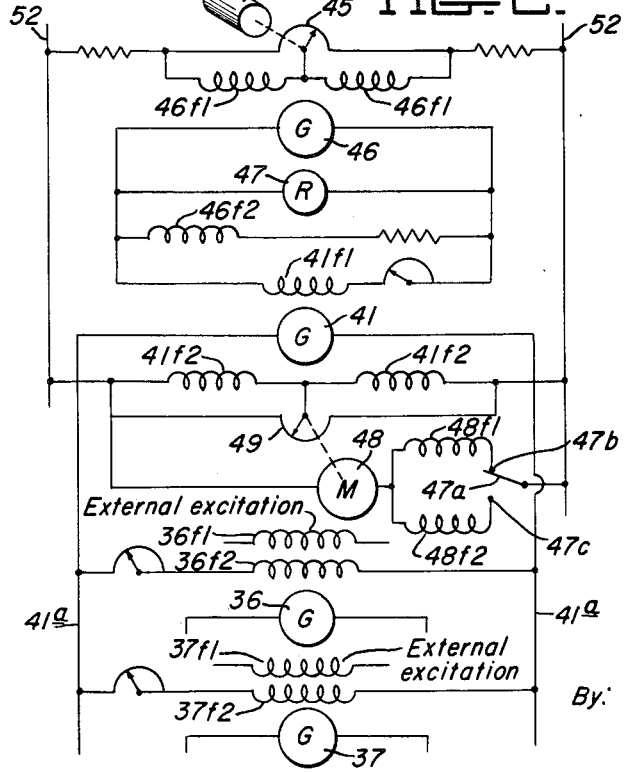
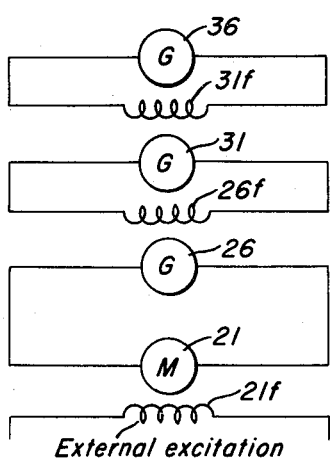
INVENTOR:
NATE S. WALKER,
By: Donald G. Dalton
his Attorney.

United States Patent Office 2,949,799
Patented Aug. 23, 1960

2,949,799

GAGE-CONTROL SYSTEM FOR MULTI-STAND STRIP MILL

Nate S. Walker, Gary, Ind., assignor to United States Steel Corporation, a corporation of New Jersey Filed Sept. 25, 1956, Ser. No. 611,986

9 Claims. (Cl. 80—35)

This invention relates to a mill for rolling metal strip and, in particular, to a gage-control system for the motors individually driving the several stands of a strip mill.

Uniform thickness of gage is one of the most important characteristics of high-quality cold-rolled strip and the tolerances established by users are becoming more stringent. It is accordingly the object of my invention to provide a gage-control system for a rolling mill, responsive to minute departures from the finished thickness desired in the product and effective quickly to exert corrective action. More specifically, my invention provides a system for adjusting the speeds of the motors driving the several stands of a mill to correct gage variations by altering the tension on the strip between stands as it is being rolled.

A complete understanding of the invention may be obtained from the following detailed description and explanation which refer to the accompanying drawings illustrating the present preferred embodiment. In the drawings:

Figure 1 is a schematic view showing the mill stands in vertical section, their motors and associated apparatus;

Figure 2 is a general circuit diagram; and

Figure 3 is a diagram of a detail circuit.

Referring now in detail to the drawings and, for the present, to Figure 1, strip S is fed from an entry reel 10 into the first stand 11 of a mill of known construction including also stands 12, 13, 14 and 15. On emerging from the last stand, the strip is recoiled on a winding reel 16. The several stands are driven by individual direct-current motors 21, 22, 23, 24 and 25, respectively. The motors are supplied with current by individual generators 26, 27, 28, 29 and 30, driven by any suitable means such as synchronous alternating-current motors. The field windings of the generators are indicated at 26f, 27f, etc.

According to my invention, I control the speeds of motors 21, 22, 24 and 25 to vary the tension on the strip. The speed of motor 23 remains generally unaffected, serving as a reference value or stabilizing condition. I increase the speeds of motors 24 and 25 slightly and decrease the speeds of motors 21 and 22 slightly when the strip leaving the mill is overgage. This increases the tension on the strip and consequently the amount of reduction effected by the several stands. If the strip leaving the mill is undergage, I decrease the speeds of motors 24 and 25 while increasing the speeds of motors 21 and 22. This decreases the tension on the strip and the amount of reduction effected by the roll stands. In all cases, the speed changes are very small on a percentage basis, since such changes materially affect the strip tension which is a significant factor in determining the reduction in thickness produced by each stand.

I control the speeds of the motors by modifying the excitation of the fields 26f, 27f, etc. of the generators supplying current to the motors. Each of the generators 26, 27, 28, 29, and 30 has a main exciter generator supplying current to the generator field windings 26f, 27f, etc. These main exciter generators are shown at 31, 32, 33, 34 and 35 and their field windings are indicated at 31f, 32f, etc. Each of the main exciter generators has a small regulator exciter supplying current to its field winding. The regulator exciters are shown at 36, 37, 38, 39, and 40. Obviously, any change in the excitation of regulating exciters 36, 37, etc. affects the excitation of the generator exciters 31, 32, etc. and consequently the output voltage of generators 26, 27, etc. and thereby controls the speed of motors 21, 22, etc. Each of the regulator exciters has two windings, one of which is shown at 36f1, 37f1, 38f1, 39f1, and 40f1. These windings are excited by an external voltage from any convenient source and thereby cause the regulator exciter to generate a certain voltage. The second set of field windings 36f2, 37f2, 39f2, and 40f2 (i.e. excluding 38f2) have a voltage applied to them from a gage-responsive control system. The voltage generated by the regulator exciters is thereby affected by the voltage applied to their second set of field windings from the gage-responsive control system.

The total generated voltage of any regulator exciter depends upon whether the voltage applied by the gage-control system is of the same or of the opposite polarity as that of the external voltage. The external voltage applied to the first set of windings furnishes the principal portion of the excitation of the regulator exciters. The second set of windings applies a minor portion of the excitation which may aid or oppose that caused by the first set of windings. The second set of field windings, 38f2, on the regulator exciter 38, are not connected to the gage-responsive control system and therefore the latter has no effect on regulator exciter 38. As a result, the gage-responsive control system has no effect on stand 13 and the speed of its motor remains substantially constant except for changes effected by the known means for varying the speed of the mill as a whole.

The current for exciting the second set of fields 36f2, 37f2, 39f2, and 40f2 of the regulator exciter generators 36, 37, 39, and 40 is supplied by a master correcting-voltage generator 41, the voltage of which is controllable even to the extent of reversing its polarity by means to be explained shortly. Generator 41 is connected to a correcting-voltage bus 41a. At this point, it is to be noted that the fields 36f2 and 37f2 of the regulator exciters 36 and 37 are connected to bus 41a in a sense opposite to that in which the fields 39f2 and 40f2 of the regulator exciters 39 and 40 are connected. As a result, when the voltage applied to bus 41a acts to increase the excitation of exciter generators 36 and 37, it simultaneously and equally decreases the excitation of exciter generators 39 and 40 and vice versa. By this arrangement, whatever the polarity of the master correcting-voltage generator 41, the voltage thereof will have an effect on the speed of motors 21 and 22 opposite to the effect produced thereby on the speed of motors 24 and 25. It now remains to describe how the voltage and polarity of the correcting generator 41 are altered in accord with the departure of the strip from the desired predetermined thickness, i.e., either overgage or undergage.

In order to control the speeds of the motors driving stands 11, 12, 14, and 15 as explained above, I provide a continuous gager 42 located between stand 15 and the winding reel 16. This gager may be of any suitable type, either contact or non-contact, which gives a signal on the occurence of a departure of the strip gage from a predetermined value. In a preferred embodiment I use a non-contact X-ray gager of a known type, available on the market. The gager 42, emits X-rays which pass through the strip and a calibrated absorber. The gager includes a converter 43 which compares the amount of X-rays passing through the strip with the amount passing through the calibrated absorber. If there is an unbalance between the two, the calibrated absorber is moved to restore a balance. The movement of the calibrated absorber causes a servo generator (not shown) to rotate. Such generator controls a servo motor 44, thereby causing it to rotate in one direction or the other depending on whether the strip is overgage or undergage. The conventional combination of a Selsyn generator and motor is a typical example of the servo generator and servo motor 44.

By means to be explained shortly, the servo motor 44 controls the voltage and polarity of an amplifying generator 46. The output of the amlifying generator 46 has two functions: one is to partially control the voltage of the correcting generator 41 by exciting one of its field windings 41f1; the second is to energize a polarized relay 47 which controls a motor 48 driving a potentiometer 49, in the circuit of a second field winding 41f2 of the correcting generator 41. The field winding 41f1 effects a direct and quick-response change in the excitation of generator 41 upon the occurrence of a gage variation. Field winding 41f2 effects a corresponding but delayed change in the excitation, i.e., a secondary or a follow-up correction which establishes a new base level of correcting voltage on bus 41a.

The sequence of control operations described above may be more fully understood by reference to the general circuit diagram of Figure 2. As there shown, servo motor 44 drives the moving contact of a potentiometer 45 connected across a direct current supply line 52. The generator 46 has a double polarity controlling field 46f1, the two halves of which are opposed and normally balanced, connected across the potentiometer so that the current through the winding is determined by the direction in which the contact of potentiometer 45 is moved from its normal midposition at which the generated voltage is zero. Generator 46 also has a shunt field 46f2 which is used for a stabilizing effect.

Relay 47 has its current or control winding connected across the armature of generator 46. It operates to cause its moving contact 47a to engage one or the other of fixed contacts 47b or 47c, depending on the polarity of the voltage developed by generator 46. Motor 48 has forward and reverse field windings 48f1 and 48f2 controlled by relay 47. Motor 48 is connected across supply line 52 and drives the moving contact of potentiometer 49 which controls the voltage applied to the double polarity-controlling field winding 41f2 of correcting generator 41. Potentiometer 49 is connected like potentiometer 45 so that the polarity of the field 41f2 is determined by the direction in which the moving contact of the potentiometer 49 shifts from its normal midposition, at which the generated voltage is zero. Generator 41 also has a shunt field 41f1, connected across generator 46. The determination of the polarity of generator 41 is thus caused partly by direct action of the voltage of generator 46 on field winding 41f1 and partly by the effect of the same voltage acting on relay 47, working through motor 48 and potentiometer 49.

The field windings 36f2, 37f2, etc., of the regulator exciter generators 36, 37, 39, and 40 are connected across generator 41 (only the first two are shown in Figure 2). If the polarity of correcting generator 41 causes generators 36 and 37 to increase the voltages of generators 31 and 32, then the voltages of generators 39 and 40 decrease the voltages of generators 34 and 35, and vice versa. In other words, if the regulator exciter fields 36f2 and 37f2 are polarized cumulatively with their fields 36f1 and 37f1 then fields 39f2 and 40f2 are differentially polarized relative to fields 39f1 and 40f1. A change in the excitation of fields 36f2, 37f2, 39f2, and 40f2 by generator 41 varies the voltages produced by generators 36, 37, 39, and 40 and thereby the armature current and speed of the motors 21, 22, 24 and 25 through the generator components as shown for the motor 21 in Figure 3. Each of the motors 21, 22, 23, 24 and 25 has a field winding such as the winding 21f for the motor 21 in Figure 3 which is excited by an external voltage from any convenient source and thus provides a constant field excitation. The end effect of a voltage developed by generator 41, therefore, is to speed up motors 21 and 22 while slowing down motors 24 and 25 or, conversely, to slow down motors 21 and 22 while speeding up motors 24 and 25, depending on whether the finished strip is under or over the desired gage.

The several exciter and regulator generators may be driven by any suitable or convenient means. The other generators may be driven by one or more motors not shown.

It will be evident from the foregoing that the invention provides a gage-control system which will automatically and quickly correct small variations in strip gage from the desired value, thus insuring production of strip more nearly uniform in thickness than has been possible by manual control. The system is sensitive and quick-acting yet is not subject to excessive hunting. The apparatus necessary comprises only standard equipment units and the overall system is relatively simple and inexpensive.

Although I have disclosed herein the preferred embodiment of my invention, I intend to cover as well any change or modification therein which may be made without departing from the spirit and scope of the invention as defined by the appended claims.

I claim:

1. In a strip mill, a plurality of roll stands, a motor for driving each of said stands and a generator for supplying current to each of said motors, the combination therewith of means for continuously gaging the strip leaving the last stand and means controlled by said gaging means simultaneously oppositely modifying the excitations of the generators of stands adjacent the entrance and exit ends of the mill, respectively.

2. In a strip mill, a plurality of roll stands, a motor for driving each of said stands and a generator for supplying current to each of said motors, the combination therewith of means for continuously gaging the strip leaving the last stand and means controlled by said gaging means effective on the delivery of overgage strip from said last stand to increase the excitation of the generator of a stand adjacent the exit end of the mill and simultaneously decrease the excitation of the generator of a stand adjacent the entrance end of the mill.

3. In a strip mill, a plurality of roll stands, a motor for driving each of said stands and a generator for supplying current to each of said motors, the combination therewith of means for continuously gaging the strip leaving the last stand and means controlled by said gaging means effective on the delivery of undergage strip from said last stand to increase the excitation of a generator of a stand adjacent the entrance end of the mill and simultaneously decrease the excitation of the generator of a stand adjacent the exit end of the mill.

4. In a strip mill, a plurality of roll stands, a motor for driving each of said stands, a generator for supplying current to each of said motors, and an exciter for each of said generators, the combination therewith of means responsive to the thickness of the strip emerging from the last stand and means controlled by said thickness-responsive means to modify simultaneously the output of the exciter of a stand adjacent the exit end of the mill in one direction and that of an exciter adjacent the entrance end of the mill in the opposite direction.

5. In a strip mill, a plurality of roll stands, a motor for driving each of said stands and a generator for supplying current to each of said motors, a main exciter and a regulating exciter for each generator, the regulating exciter being connected to the field winding of the main exciter, means for gaging the strip emerging from the last stand and means controlled by said gaging means effective simultaneously to vary the voltage of the regulating exciter of a stand adjacent the entrance end of the mill in one direction and to vary the voltage of the regulating exciter of a stand adjacent the exit end in the opposite direction.

6. A strip mill as defined in claim 5, characterized by said voltage varying means including a master correcting-voltage generator connected to the field windings of said regulating exciters, the field windings of the regulating exciters of the stands adjacent the entrance end of the mill being connected to said master correcting-voltage generator in one sense and those of the stand adjacent the exit end being connected thereto in the opposite sense.

7. A strip mill as defined in claim 6 characterized by said voltage varying means also including an amplifying generator and said master voltage-correcting generator having one field winding connected to said amplifying generator, and a second field winding, a potentiometer controlling said second field winding, and means for adjusting said potentiometer according to variations in the voltage of said amplifying generator.

8. In a strip mill, a plurality of roll stands, a motor for driving each of said stands and a main generator for supplying current to each of said motors, a main exciter and a regulator exciter for each generator said regulator exciter being connected to the field winding of said main exciter, a master correcting-voltage generator connected to the field windings of said regulator exciters and means responsive to the gage of the strip emerging from the last stand effective to control the excitation of said master correcting-voltage generator, the field winding of the regulator exciter of the main generator of the last stand being connected to said master correcting-voltage generator in the reverse direction from the field winding of the regulator exciter of the main generator for the first stand.

9. In a strip mill, a plurality of roll stands and a motor for driving each stand, the combination therewith of means continuously gaging the strip emerging from the last stand of rolls and means controlled by said gaging means effective simultaneously to vary the speed of the motor of a stand adjacent the exit end of the mill in one direction and the speed of the motor of a stand adjacent the entrance end of the mill in the opposite direction.

References Cited in the file of this patent

UNITED STATES PATENTS

| 1,265,328 | Henderson | May 7, 1918 |
| 1,341,651 | Lammers | June 1, 1920 |
| 2,295,399 | Hanna | Sept. 8, 1942 |
| 2,586,412 | Winchester | Feb. 19, 1952 |
| 2,626,376 | Harder | Jan. 20, 1953 |

FOREIGN PATENTS

| 533,162 | Great Britain | Feb. 7, 1941 |